June 17, 1952  C. G. ARENGO  2,600,829
TOOL SETTING DEVICE ON LATHES AND OTHER MACHINE TOOLS
Filed April 15, 1949  5 Sheets-Sheet 4

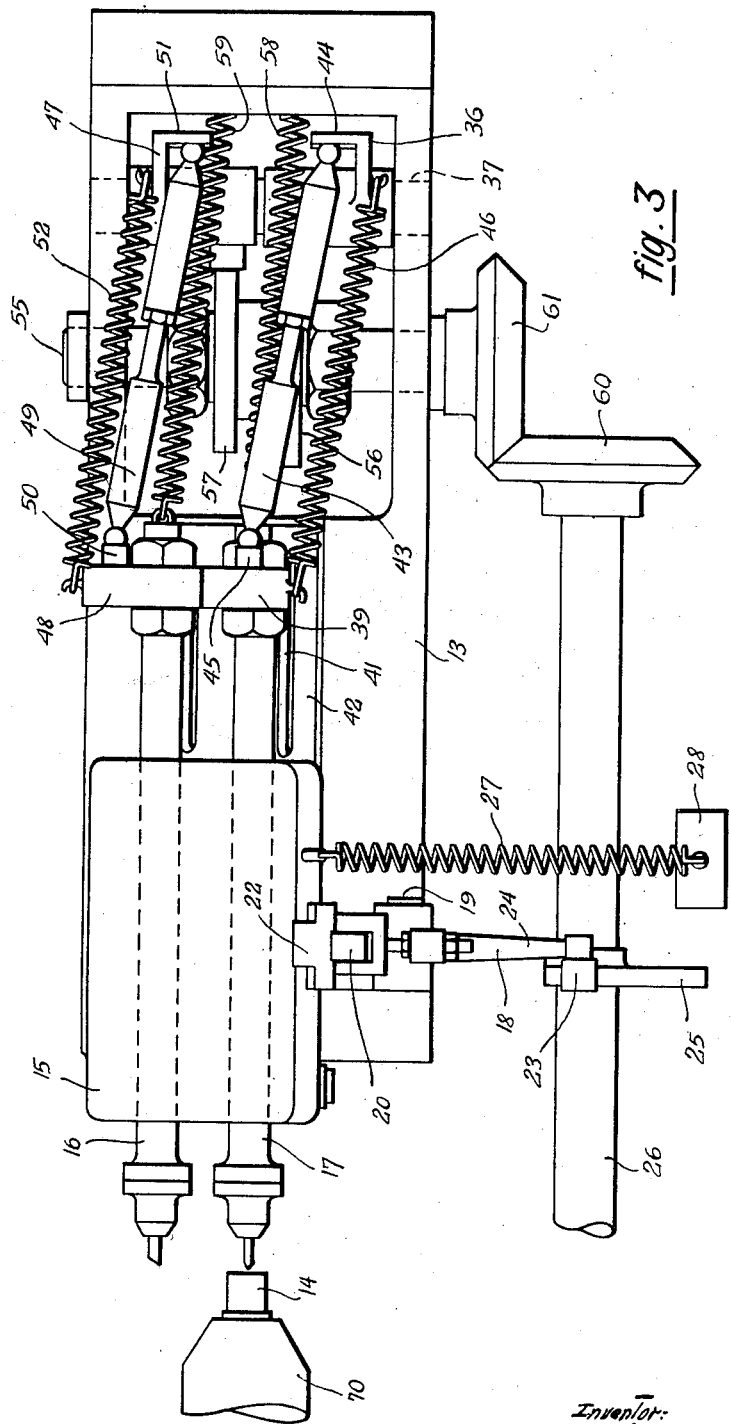

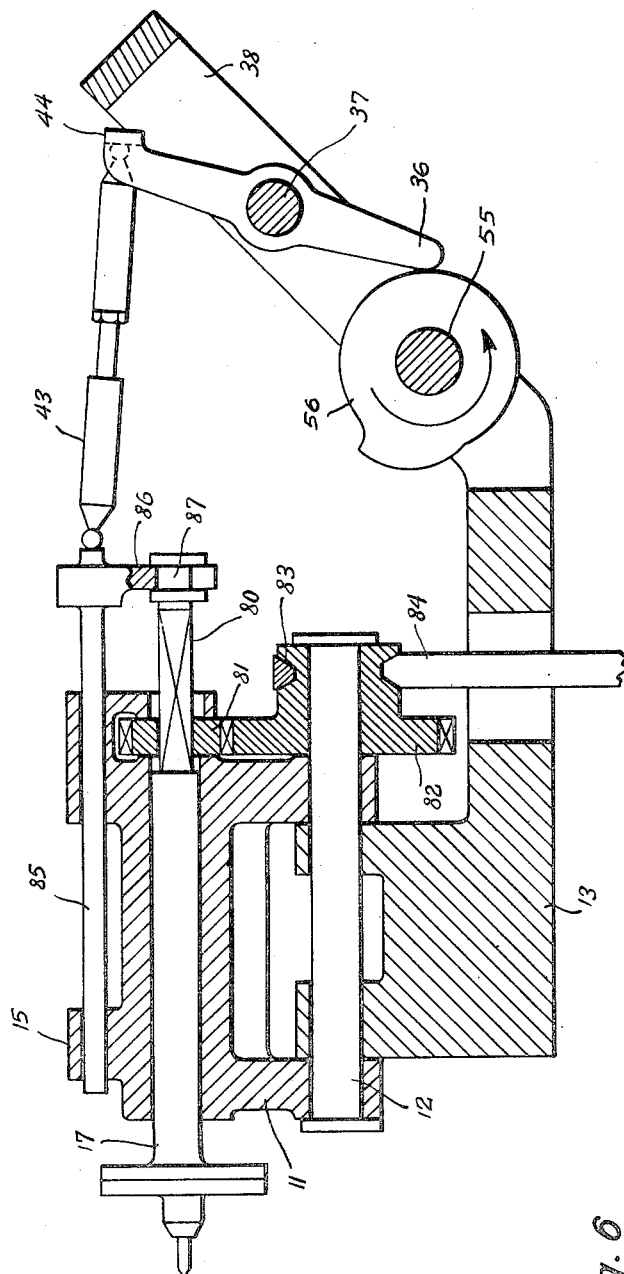

Patented June 17, 1952

2,600,829

UNITED STATES PATENT OFFICE 2,600,829

TOOL SETTING DEVICE ON LATHES AND OTHER MACHINE TOOLS

Christopher Guy Arengo, Portishead, England, assignor of one-half to Bristol Repetition Limited, Portishead, England, a company of Great Britain and Northern Ireland Application April 15, 1949, Serial No. 87,651
In Great Britain April 14, 1948

5 Claims. (Cl. 29—55)

This invention relates to tool setting devices on lathes and other machine tools, particularly of the type wherein two or more tools are mounted so as to be brought into operation on the work in succession.

In known forms of apparatus of the type described the tools, which may be drills, are mounted on rotatable or non-rotatable spindles, and are adapted to be advanced and retracted in sequence in relation to the work, and the head or other device on which the tools and/or their spindles are mounted has to be indexed in order to bring the required tool into registration with the work. The indexing operation can only be carried out when the spindle carrying a tool has been retracted and prior to another tool being advanced, and considerable time is lost in so retracting a tool, indexing the head, and advancing another tool to its operative position.

The object of the present invention is to provide improvements in devices of the type described whereby the time occupied in the various setting operations may be reduced.

According to this invention a tool spindle carrier is pivotally mounted on a bed plate or like member, two or more tool spindles are mounted in the carrier and are adapted for axial movement in the carrier, the direction of such axial movement preferably being parallel to the axis of pivotal movement of the carrier, means are provided to effect said axial movement, said means comprising a universal joint, means are provided to effect pivotal movement of the said carrier, and the said means for effecting axial movement of the tool spindles and for effecting pivotal movement of the carrier are interconnected so as to be actuated simultaneously.

In the accompanying drawings:

Fig. 3 is a plan view.

Fig. 6 is a longitudinal sectional elevation, taken on line VI—VI of Fig. 5.

Figure 1:
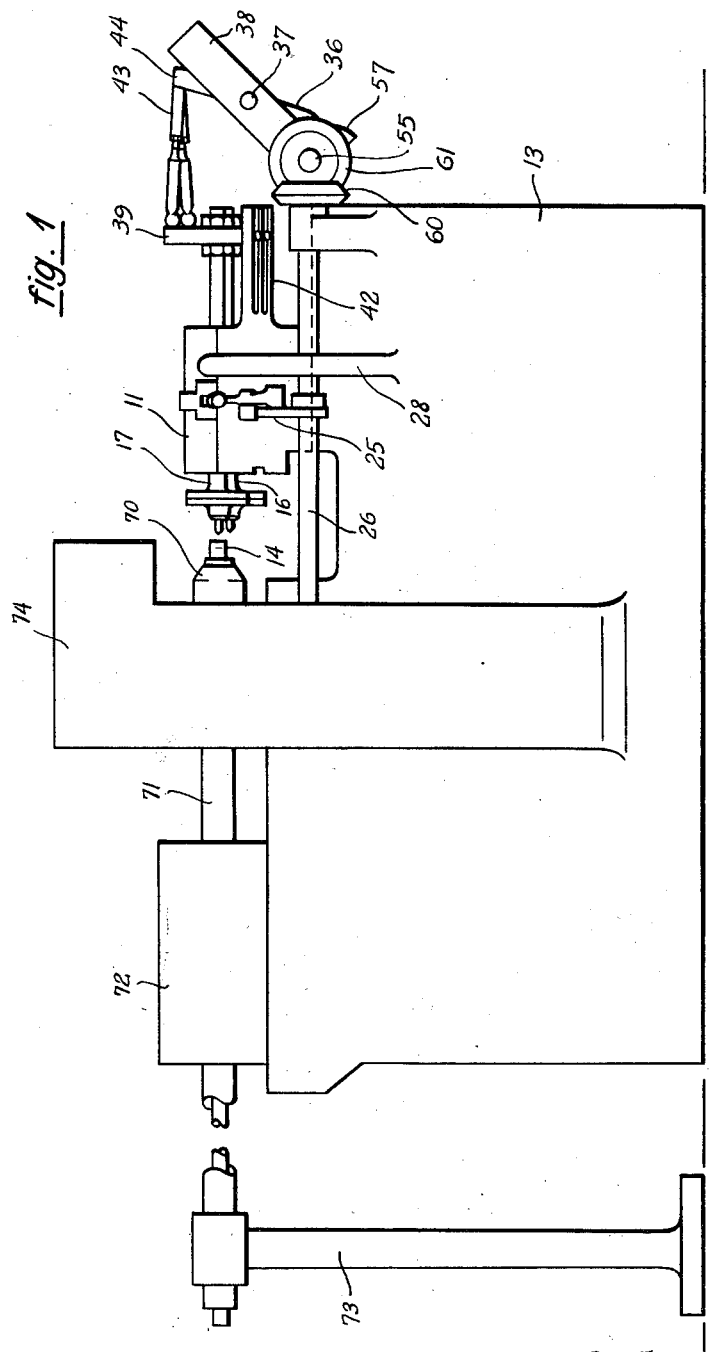
Fig. 1 is a substantially diagrammatic side elevation of an automatic lathe incorporating one form of the invention.
Figure 2:
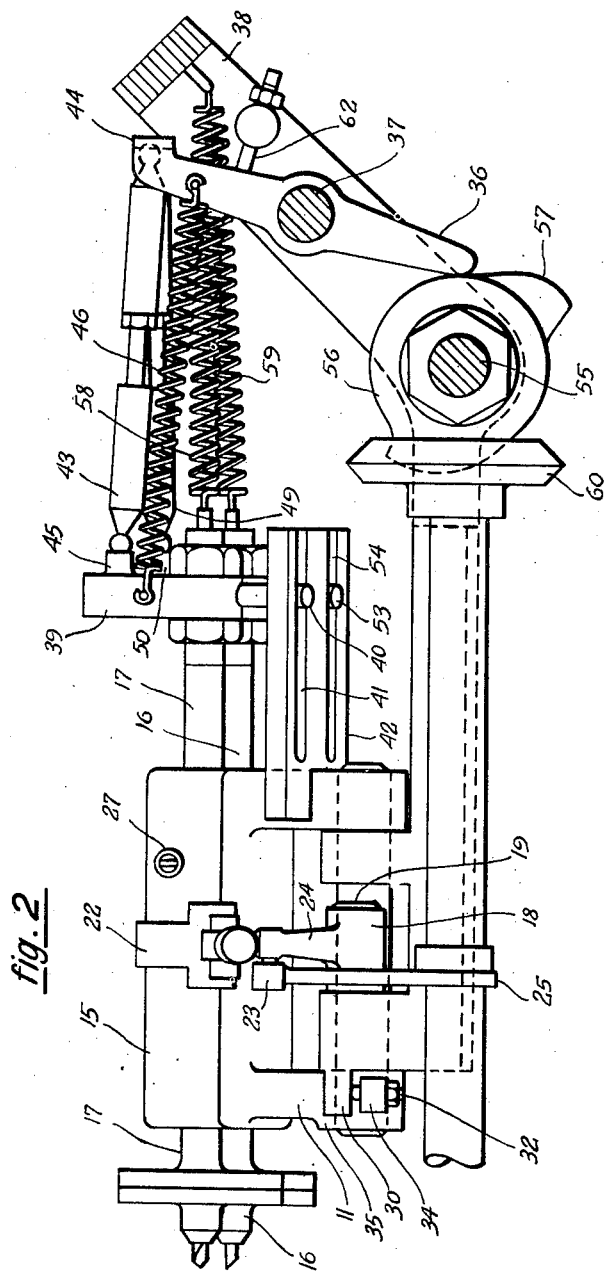
Fig. 2 is a side elevation, to a large scale, of the mechanism of the invention.

Referring to Figs. 1 to 4, the work-piece 14, which may be a stock bar, is disposed in a chuck 70 and a hollow spindle 71, the spindle being rotated by driving mechanism indicated at 72 and also being supported by a stand 73 and a mounting 74 on the machine base or bed 13. A tool spindle carrier 11 is pivotally mounted on a spindle 12 on the bed 13 of the machine, the axis of the pivot spindle 12 being parallel with the axis of the work-piece 14. The carrier 11 comprises a head 15 in which two tool spindles 16, 17 are slidably mounted so as to be reciprocated therein. The axes of the spindles 16, 17 are parallel with the axis of the spindle 12 and with the axis of the work-piece 14, and all of said axes are horizontal. The axes of the spindles 16, 17 are both disposed at the same radius from the axis of the carrier pivot 12, and said radius is equal to the straight line distance between the axis of the carrier pivot 12 and the axis of the work-piece 14 so that by moving the carrier 11 arcuately about its pivot 12 either of the tool spindles 16, 17 may be brought with its axis into alignment with the axis of the work-piece 14.

The pivotal movement of the carrier 11 is effected by a bell-crank lever 18 mounted on a pivot 19 and having a roller 20 on the end of one arm 21 adapted to abut a track 22 on one side of the carrier head 15, a roller 23 on the end of the other arm 24 of said lever being adapted to be engaged by a cam 25 mounted on a spindle 26 so as to be rotated therewith. As the cam 25 rotates, the lever 18 is rocked so as to move the carrier 11 arcuately on its pivot 12; return movement of the carrier 11 is effected by a tension spring 27 connected by one end to the carrier head 15 and by its other end to a fixed anchorage 28 so as to operate in opposition to the bell-crank lever 18. Stops 29, 30 on the bed 13 are adapted to be abutted by adjustable studs 31, 32 in lugs 33, 34 on the carrier boss 35 so as to limit the arcuate movement of the carrier to bring either of the tool spindles 16, 17 into alignment with the work-piece 14.

A lever 36 is pivotally mounted by a pivot rod 37 on a rearwardly and upwardly extending portion 38 of the bedplate. A bracket 39 is rigidly mounted on the rear end of the tool spindle 17, the said bracket being provided with a pin 40 adapted to project into and slide in a longitudinal slot 41 in a rearwardly extending portion 42 of the carrier 11 whereby the spindle 17 is restrained against rotation in the carrier 11. A rod 43, comprising two parts threadedly connected for adjustability in length, is disposed between the upper end 44 of the lever 36 and the bracket 39, ball ends of the rod 43 reposing in a cup abutment 45 on the bracket and a similar cup abutment in said upper end of the lever, the arrangement being such that the rod forms a universally jointed push-rod between the lever and the bracket; the rod is retained between the lever and the bracket by a tension spring anchored to the lever and to the bracket. The tool spindle 16 is similarly associated with a lever 47, also pivotally mounted on the rod 37, by means of a bracket 48, ball-ended adjustable push-rod 49, cup abutment 50 on the bracket, a cup abutment in the end 51 of the lever, and a tension spring 52, the bracket 48 being provided with a pin 53 projected into and sliding in a slot 54 in the carrier extension 42. A camshaft 55 is provided, on which two cams 56, 57 are mounted, and each cam is adapted to co-operate with the lower ends of the levers 36, 47, respectively, so that as the camshaft and cams are rotated the said levers are rocked on their pivot 37 so as to cause the respective tool spindles 16, 17 to be pushed forwardly in the carrier head 15, and tension springs 58, 59 anchored at one end to the bedplate extension 38 and at their other ends to the tool spindles 17, 16, respectively, operate to retract the tool spindles in the carrier head.

The camshaft 55 and the camshaft 26 are interconnected by bevel gearing 60, 61, so that all of the cams 25, 56 and 57 are rotated simultaneously, the rotational ratio being one to one.

The relative timing of the cams 25, 56 and 57 is so adjusted that the sequence of operations is as follows: Assuming the tool spindle 16 to be in alignment with and advanced up to the work-piece 14, on completion of the working operation the cam 57 releases the lever 47 whereby to allow the spindle 16 to be retracted from the work-piece and simultaneously the cam 25 operates the lever 18 so as to move the carrier 11 about its pivot 12 to bring the tool spindle 17 into alignment with the work-piece; thereafter the cam 56 actuates the lever 36 to advance the tool spindle 17 up to the work as the carrier takes up its new position. On completion of this working operation the cam 56 releases the lever 36 to allow the spindle 17 to be retracted from the work-piece; simultaneously, the cam 25 releases the lever 18, the spring 27 returns the carrier 11 to the position with the tool spindle 16 in alignment with the work-piece, and the cam 57 actuates the lever 36 to advance the tool spindle 16 up to the work as the carrier takes up its new position. The retraction of one tool spindle may overlap the advancement of the other tool spindle, provided that the tools are clear of the work-piece during the arcuate movement of the carrier. The provision of universal joints between the push rods 43, 49 and the levers 36, 47 and brackets 39, 48 enables the arcuate movement of the carrier and tool spindles to be effected without movement of the levers, 36, 47 other than such movement as is effected by the cams 56, 57.

Adjustable stops 62 on the bedplate extension 38 are adapted to limit rearward movement of the upper ends of the levers 36 and 47.

Figure 5:
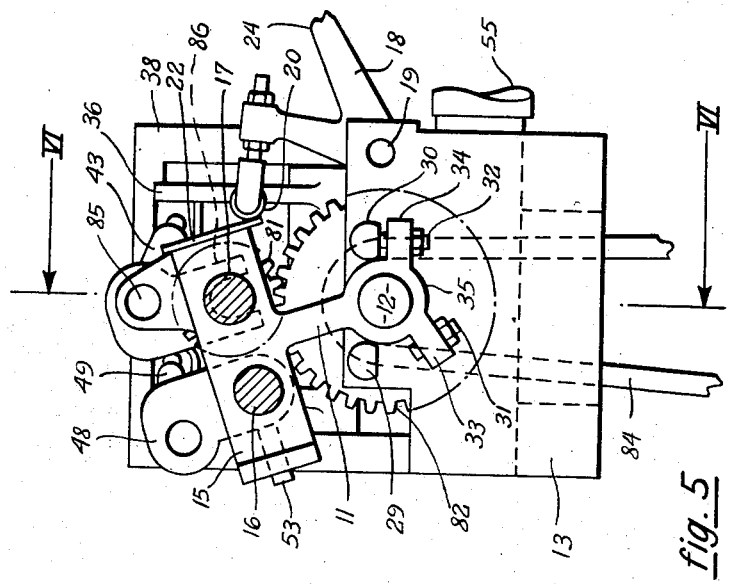
Fig. 5 is an end elevation of a modified form of the invention.
Figure 4:
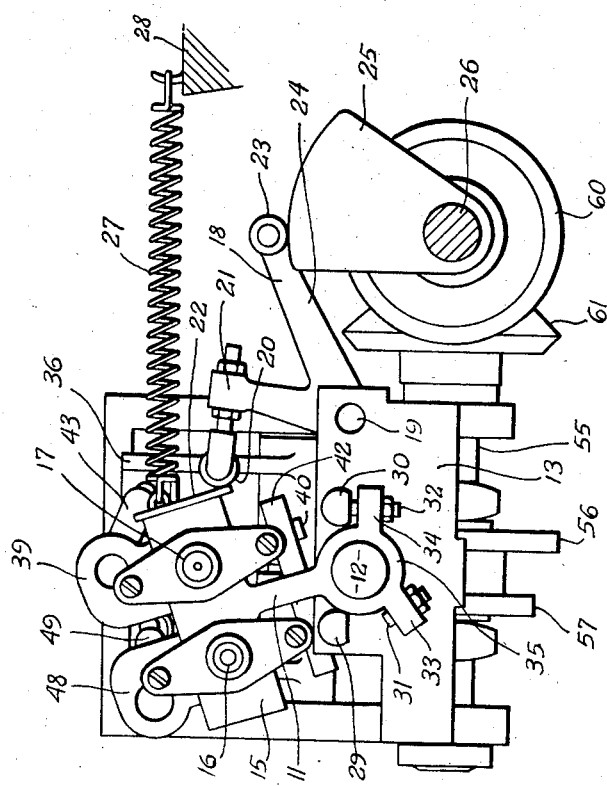
Fig. 4 is an end elevation, looking from the right of Fig. 2.

In the modified form of the invention illustrated in Figs. 5 and 6, wherein the tool spindle 17 is rotatable and the spindle 16 is non-rotatable, the spindle 17 is splined at 80, and a correspondingly splined toothed gear wheel 81 is mounted thereon so that the spindle 17 and gear wheel may rotate together but may slide relatively to each other. The gear wheel 81 is in mesh with another toothed gear wheel 82 freely rotatably mounted on the spindle 12 and provided with a belt pulley 83 whereby it may be driven by a belt 84 from the main drive of the machine. A rod 85 is slidably mounted in the carrier head 15, parallel to the spindle 17, and is connected to the lever 36 in the manner previously described with reference to the spindle 17 and lever 36 in Figs. 1 to 4. A forked bracket 86 is rigidly mounted on the rod 85 and engages an annular groove 87 on the spindle 17; thereby, the rod 85 is directly actuated by the lever 36 and its associated springs, and the spindle 17 is withdrawn or advanced by the rod 85. The spindle 16 is mounted and actuated in similar manner to that described with reference to Figs. 1 to 4, except that the pin 53 projects from one side of the bracket 48, Fig. 5.

When both tool spindles are adapted to rotate, and are rotatably driven by suitable means, a rod is slidably disposed in the carrier, parallel to the tool spindle, one such rod for each spindle, and each of said rods carries a fork adapted to embrace a spindle and co-operate with a collar on the spindle so that as the said rod is reciprocated in the carrier the spindle is correspondingly reciprocated in the carrier head. The rod is connected by a universally jointed connecting rod to a cam-actuated lever in the manner hereinbefore described.

In some cases one cam-actuated lever and connecting rod may be provided for all of the tool spindles, the connecting rod being connected by suitable means to all of the spindles.

There may be three or more tool spindles provided in the carrier, with complementary cam-actuated levers and connecting rods, the timing between the reciprocation of the tool spindles and the arcuate movement of the carrier being adjusted so as to bring any one of the tools into registration with and operation on the work in a required sequence.

What I claim and desire to secure by Letters Patent is:

1. A tool-setting device for lathes and other machine tools comprising a tool spindle carrier mounted for pivotal movement about an axis parallel to the work-piece axis of the lathe, at least two tool spindles mounted in the carrier and adapted for axial movement in the carrier, the direction of such axial movement being parallel to the axis of pivotal movement of the carrier, separate means continuously operatively connected to each said tool spindle for effecting said axial movement of tool spindles, each said means comprising a universal joint, and means for effecting pivotal movement of the said carrier, the said means for effecting axial movement of the tool spindles and for effecting pivotal movement of the carrier being interconnected so as to be actuated simultaneously.

2. A tool-setting device for lathes and other machine tools comprising a tool spindle carrier mounted for pivotal movement about an axis parallel to the work-piece axis of the lathe, at least two tool spindles mounted in the carrier and adapted for axial movement in the carrier, the direction of such axial movement being parallel to the axis of pivotal movement of the carrier, separate means for effecting said axial movement of each said tool spindle, and means for effecting pivotal movement of the said carrier, the said means for effecting axial movement of the tool spindles and for effecting pivotal movement of the carrier being interconnected so as to be actuated simultaneously, said means for effecting axial movement of each said tool spindle comprising a push rod, a universal joint operatively connecting said push rod at one end to said spindle, a lever, a universal joint operatively connecting said lever to the other end of said push rod, a cam engaging said lever, means for rotating said cams, and a retracting spring operatively connected to each said tool spindle.

3. A tool-setting device according to claim 2, each said push rod comprising two parts threadedly connected for adjustability in length.

4. A tool-setting device according to claim 2, including means holding one of said tool spindles against rotation.

5. A tool-setting device according to claim 2, one of said tool spindles being rotatable, and including a rod slidably mounted in said carrier parallel to said tool spindle, rotational drive means for said spindle, means interconnecting said rod and said tool spindle to allow the spindle to rotate while being axially movable synchronously with said rod, said rod being connected to one of said cam-actuated levers by one of said push rods.

CHRISTOPHER GUY ARENGO.

REFERENCES CITED

The following references are of record in the file of this patent:

UNITED STATES PATENTS

| Number | Name | Date |
| --- | --- | --- |
| 851,742 | Gates | Apr. 30, 1907 |
| 1,063,744 | Seward | June 3, 1913 |

FOREIGN PATENTS

| Number | Country | Date |
| --- | --- | --- |
| 143,432 | Germany | Aug. 15, 1903 |
| 11,686 | Great Britain | Feb. 4, 1915 |